No. 765,973. Patented July 26, 1904.

UNITED STATES PATENT OFFICE.

WILLIAM F. HOGAN, OF BOSTON, MASSACHUSETTS.

RUBBER COMPOUND.

SPECIFICATION forming part of Letters Patent No. 765,973, dated July 26, 1904.

Application filed January 16, 1904. Serial No. 189,275. (No specimens.)

*To all whom it may concern:*

Be it known that I, WILLIAM F. HOGAN, a citizen of the United States, and a resident of Boston, in the county of Suffolk and State of Massachusetts, have invented a new and useful Improvement in Rubber Compounds, of which the following is a specification.

My invention relates to improvements in compounds of rubber with an abrasive material; and the object of my invention is to provide a new and useful compound of the class described for use in heels and soles of boots and shoes, in rubber tires, overshoe-bottoms, belting, hose-pipe, and, in general, for all purposes where durability and friction are desirable features in any article made of rubber.

In my new compound I make use of a new abrasive mineral known as "georgeite." So far as known to me, this mineral has never before been used for abrasive purposes as an ingredient of a rubber compound of the class described. By reason of its being of nearly the same specific gravity as rubber and of the same general color as that substance it is peculiarly adapted for use as an ingredient of such a compound. It is of a hardness equal to that of most commercial emery and possesses abrasive qualities equal to any natural substance used except pure corundum. This new mineral, georgeite, is most nearly classified mineralogically as a basanite.

The mined georgeite is ground and sized and is then incorporated with "rubber," by which term I mean to embrace rubber of commercial qualities varying with the different formulas now commonly used in the manufacture thereof. It will be understood that different classes of goods require different-sized grains of the georgeite, ranging probably from as coarse as No. 80 to as fine in some instances as No. 200. The abrasive qualities of the georgeite do not depend entirely upon its breaking into irregular fractures, examination with a magnifying-glass showing abrasive qualities upon every fracture plane. Hence no matter how worn the individual particles become a frictional or non-slippable surface is maintained, and as the rubber matrix wears away fresh particles of the georgeite come to the wear-surface, thereby preserving to the limit of its usefulness the non-slippable character of the material. The proportion of the georgeite used will vary from as low as four per cent. to as high as sixteen per cent., depending upon the work required of the goods. To my new compound I have given the name "friction rubber."

I am well aware that emery, sand, galena, asbestos, antimony, and other gritty substances have been compounded with rubber, either alone or with other ingredients, and do not claim such compounds; but

What I claim is—

The herein-described rubber compound made by thoroughly incorporating georgeite with rubber in the proportions substantially as described.

In testimony whereof I have hereunto set my hand, this 14th day of January, 1904, at Boston, in the presence of two witnesses.

WILLIAM F. HOGAN.

Witnesses:
WILLIS G. MYERS,
HENRY A. WYMAN.